United States Patent
Lin et al.

(10) Patent No.: US 10,892,943 B2
(45) Date of Patent: Jan. 12, 2021

(54) FAILURE RECOVERY METHOD AND APPARATUS FOR VIRTUAL NETWORK

(71) Applicant: Huawei Technologies Co., Ltd., Shenzhen (CN)

(72) Inventors: Yi Lin, Shenzhen (CN); Jia He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/784,986

(22) Filed: Oct. 16, 2017

(65) Prior Publication Data

US 2018/0041380 A1 Feb. 8, 2018

Related U.S. Application Data

(63) Continuation of application No. PCT/CN2015/076911, filed on Apr. 17, 2015.

(51) Int. Cl.
*H04L 12/24* (2006.01)
*H04L 12/703* (2013.01)
*H04L 12/911* (2013.01)
*H04L 12/715* (2013.01)
*H04L 12/707* (2013.01)

(52) U.S. Cl.
CPC ........ *H04L 41/0654* (2013.01); *H04L 41/065* (2013.01); *H04L 41/0659* (2013.01); *H04L 41/0677* (2013.01); *H04L 45/22* (2013.01); *H04L 45/28* (2013.01); *H04L 47/746* (2013.01); *H04L 45/64* (2013.01)

(58) Field of Classification Search
CPC ............ H04L 41/0604; H04L 41/0618; H04L 41/0654; H04L 41/0677; H04L 41/065; H04L 41/0659; H04L 45/22; H04L 45/28; H04L 45/64; H04L 47/746
See application file for complete search history.

(56) References Cited

U.S. PATENT DOCUMENTS 6,304,549 B1 * 10/2001 Srinivasan .......... H04L 12/5602
370/230
8,271,557 B1 9/2012 Lysaght et al.
(Continued)

FOREIGN PATENT DOCUMENTS

CN 102148737 A 8/2011
CN 103475504 A 12/2013
(Continued)

OTHER PUBLICATIONS

Machine Translation and Abstract of Chinese Publication No. CN102148737, Aug. 10, 2011, 10 pages.
(Continued)

*Primary Examiner* — Joshua Kading
(74) *Attorney, Agent, or Firm* — Conley Rose, P.C.

(57) ABSTRACT

A failure recovery method for a virtual network, includes determining, by a network device, that a physical link in a physical network fails, where the failed physical link corresponds to at least one virtual link in the virtual network, and mapping the at least one virtual link corresponding to the failed physical link to a non-failed physical resource in the physical network, where the non-failed physical resource satisfies a transmission bandwidth of each of the at least one virtual link.

20 Claims, 4 Drawing Sheets

```
┌─────────────────────────────────────┐
│  Determine that a physical link in a │  ← S401
│  physical network fails, where the   │
│  failed physical link corresponds to │
│  at least one virtual link in a      │
│  virtual network                     │
└─────────────────────────────────────┘
                  │
                  ▼
┌─────────────────────────────────────┐
│  Map the at least one virtual link   │  ← S402
│  corresponding to the failed physical│
│  link to a non-failed physical       │
│  resource in the physical network,   │
│  where the non-failed physical       │
│  resource satisfies a transmission   │
│  bandwidth of each of the at least   │
│  one virtual link                    │
└─────────────────────────────────────┘
```

(56) References Cited

U.S. PATENT DOCUMENTS

2012/0017110 A1* 1/2012 Omar .................. H04L 41/0663
 714/2
2014/0092726 A1 4/2014 Khan et al.

FOREIGN PATENT DOCUMENTS

| CN | 103634153 A | 3/2014 |
|---|---|---|
| CN | 103716176 A | 4/2014 |
| CN | 104243232 A | 12/2014 |
| EP | 2713556 A1 | 4/2014 |
| WO | 0042746 A1 | 7/2000 |

OTHER PUBLICATIONS

Machine Translation and Abstract of Chinese Publication No. CN103475504, Dec. 25, 2013, 20 pages.
Foreign Communication From A Counterpart Application, PCT Application No. PCT/CN2015/076911, English Translation of International Search Report dated Jan. 20, 2016, 2 pages.
Foreign Communication From A Counterpart Application, PCT Application No. PCT/CN2015/076911, English Translation of Written Opinion dated Jan. 20, 2016, 6 pages.
Machine Translation and Abstract of Chinese Publication No. CN103634153, Mar. 12, 2014, 14 pages.
Foreign Communication From A Counterpart Application, European Application No. 15888844.6, Extended European Search Report dated Mar. 27, 2018, 9 pages.
Basic Concepts in ATM, http://denninginstitute.com/modules/atm/bconcepts.html, Jun. 9, 2017, 2 pages.
Ahuja, S., "Asynchronous Transfer Mode (ATM)," School of Computing, UNF, Aug. 29, 2017, 21 pages.
Machine Translation and Abstract of Chinese Publication No. CN104243232, Dec. 24, 2014, 12 pages.

\* cited by examiner

FAILURE RECOVERY METHOD AND APPARATUS FOR VIRTUAL NETWORK

CROSS-REFERENCE TO RELATED APPLICATION

This application is a continuation of International Patent Application No. PCT/CN2015/076911 filed on Apr. 17, 2015, which is hereby incorporated by reference in its entirety.

TECHNICAL FIELD

The present disclosure relates to the field of communications technologies, and in particular, to a failure recovery method and apparatus for a virtual network.

BACKGROUND

With development of Internet technologies, especially with rapid development of a data center (DC), a client has a growing requirement for transport network traffic. Therefore, the client usually not only needs to lease a point-to-point connection to transmit data, but also needs to lease a virtual network to connect multiple service access points (for example, DCs) of the client. The client may establish, in the leased virtual network according to a requirement of the client, a connection between any two service access points to transmit data of the client.

In network virtualization, a physical node resource (a computing resource, a forwarding resource, and the like) and a physical link resource (a bandwidth) that are in a physical network are sliced into virtual resources at a fine granularity using a virtualization technology on a shared physical platform, and abstraction, slicing, and combination are performed based on the virtual resources, to form multiple parallel and programmable virtual networks that are mutually isolated. Further, the network virtualization technology is used to abstract a public substrate network (SN), that is, a physical network, and provide a unified programmable interface, and multiple virtual networks that are isolated from each other and have different topologies are mapped to an infrastructure of the public SN in order to provide differentiated services for users. The network virtualization technology may allow a physical network to support multiple virtual networks. In virtual networks, mutually independent protocol systems may be used, and node and link resources in the physical network can be properly configured according to a dynamically changing requirement of a client, thereby enhancing flexibility and diversity of the virtual networks. A physical resource, for example, a bandwidth, in the physical network is mapped to the virtual network such that when using the virtual network, the client has user experience the same as that offered by an exclusive physical network. A virtual network mapping process is an indispensable part of the network virtualization technology, and a main function of the mapping process is to properly map a virtual network request (Virtual Request) of the client to an SN provided by an operator. In the mapping process, virtual networks need to be separated to prevent the virtual networks from affecting each other in order to ensure quality of service (QoS) of each virtual network user. In addition, underlying physical network resources need to be properly allocated to the most extent in order to improve resource utilization.

When providing a bandwidth service, a transport operator needs to provide a client with a bandwidth failure recovery capability, that is, when a network fails, the transport operator can restore data transmission for the client. In other approaches, the transport operator can only perform failure recovery for a point-to-point connection in a physical network. For example, the transport operator establishes a working path connection in the physical network, and service data is transmitted on a working path. When the working path fails, a recovery path separated from the working path is re-planned in a free resource in the physical network, and the service data is switched to the recovery path for transmission. In the other approaches, a failure recovery mechanism is provided only for a point-to-point connection in a physical network, and no failure recovery mechanism is provided for a virtual network corresponding to the physical network. Consequently, user experience is reduced.

SUMMARY

In view of this, embodiments of the present disclosure provide a failure recovery method for a virtual network, a transport controller, and a system in order to resolve a problem that no failure recovery mechanism can be provided for the virtual network when the virtual network fails.

According to a first aspect, an embodiment of the present disclosure provides a failure recovery method for a virtual network, including determining that a physical link in a physical network fails, where the failed physical link corresponds to at least one virtual link in the virtual network, and mapping the at least one virtual link corresponding to the failed physical link to a non-failed physical resource in the physical network, where the non-failed physical resource satisfies a transmission bandwidth of each of the at least one virtual link.

According to a second aspect, an embodiment of the present disclosure provides a failure recovery apparatus for a virtual network, including a processor and a memory, where the processor is configured to perform a program, and the memory is configured to store the program, where the program is used to determine that a physical link in a physical network fails, where the failed physical link corresponds to at least one virtual link in the virtual network, and map the at least one virtual link corresponding to the failed physical link to a non-failed physical resource in the physical network, where the non-failed physical resource satisfies a transmission bandwidth of each of the at least one virtual link.

According to a third aspect, an embodiment of the present disclosure provides a failure recovery method for a virtual network, where mapping the virtual network to a physical network includes determining that a physical link in the physical network fails, where the physical link corresponds to a virtual link in the virtual network, establishing a backup link of the physical link, where a physical resource on the backup link corresponds to a physical resource on the physical link, and mapping the virtual link to the backup link.

According to a fourth aspect, an embodiment of the present disclosure provides a computer device, including a processor, a memory, a bus, and a communications interface, where the memory is configured to store a computer-executable instruction, the processor and the memory are connected using the bus, and when the computer runs, the processor executes the computer-executable instruction stored in the memory such that the computer performs the method according to any one of the first aspect or the possible implementations of the first aspect.

BRIEF DESCRIPTION OF DRAWINGS

To describe the technical solutions in the embodiments of the present disclosure more clearly, the following briefly describes the accompanying drawings required for describing the background and the embodiments. The accompanying drawings in the following description show merely some embodiments of the present disclosure, and a person of ordinary skill in the art may still derive other accompanying drawings or embodiments according to these drawings or description without creative efforts, and the present disclosure aims to cover all these derived accompanying drawings or embodiments.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
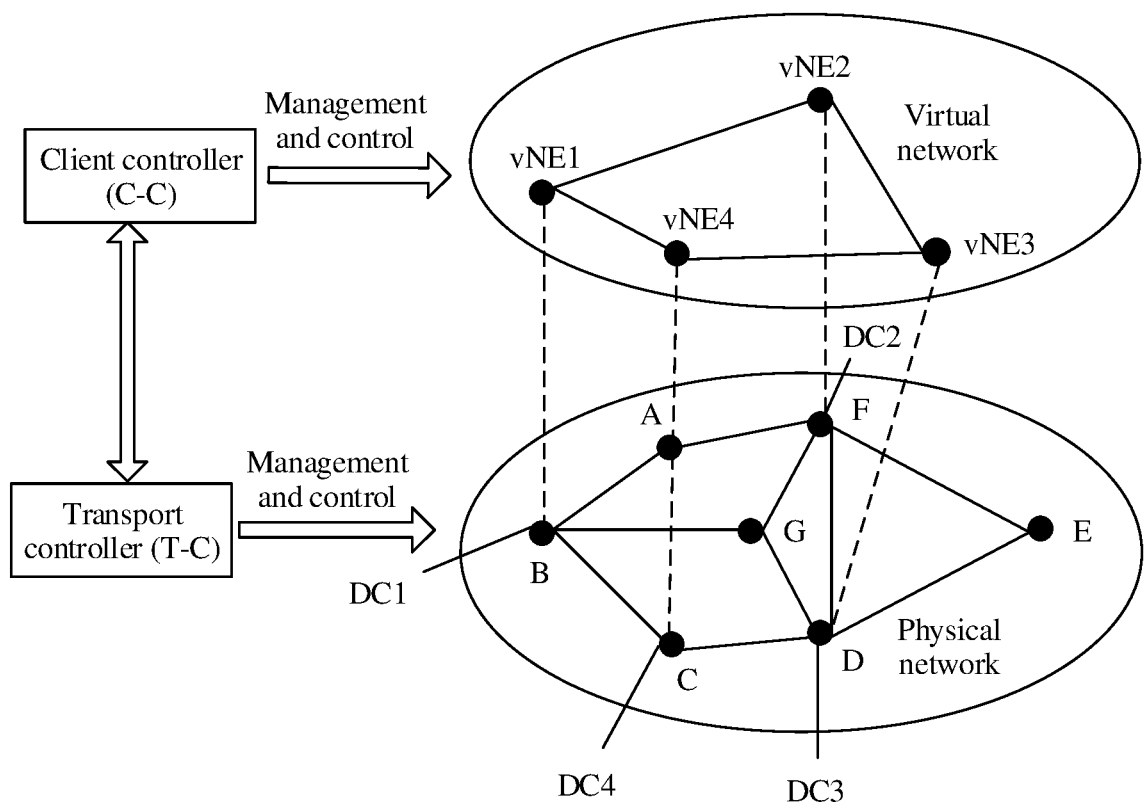
FIG. 1 is an architectural diagram of physical network virtualization.

FIG. 1 shows an architectural diagram of physical network virtualization according to an embodiment of the present disclosure. An architecture of physical network virtualization includes a virtual network layer and a physical network layer (that is, an infrastructure network layer). The physical network layer includes many SNs. An SN is formed by connecting physical nodes using physical links, and is usually considered as a physical network formed by interconnecting infrastructure resources. Common physical nodes include a router, a switch, and the like, and physical links include an optical fiber, a cable, a twisted pair, and the like. The virtual network layer includes many virtual networks. A virtual network is formed by connecting virtual nodes using virtual links, and is usually considered as a logical network established over an SN using a virtualization technology.

The physical network shown in FIG. 1 may be an Optical Transport Network (OTN), and a physical network of the OTN includes seven physical nodes, A, B, C, D, E, F, and G. Each physical node may be an optical communications entity, for example, an OTN device, and different physical nodes are connected using optical fibers. Links in the network may be classified into types such as an Optical Channel Data Unit 1 (ODU1), an ODU2, an ODU3, and an ODU4 according to a granularity. For example, it is assumed that a link in the network is an ODU2 link, and a bandwidth of the ODU2 link is 10 gigabits per second (Gbps). In the OTN, a Transport Controller (T-C) is connected to each physical node using a control plane to control the physical network. Further, each physical node has a control message processing unit, and multiple control message processing units of physical nodes are interconnected using the physical network to form the control plane. The control plane is responsible for implementing call control and connection control functions, and can recover a connection when a failure occurs. The T-C may be a standalone server having a central processing unit (CPU), a memory, and the like. Alternatively, the T-C may be implemented on one of the physical nodes, and the physical node should have all functions of the T-C. The T-C may be used to perform operations such as connection establishment, failure detection, and failure recovery on the physical network. For example, a T-C may establish an end-to-end service connection in the physical network according to a service requirement of a client, and carry a service using the established service connection. In addition, the T-C may perform operations such as modification and deletion on the established service connection.

It is assumed that a client has four DCs, that is, a DC1, a DC2, a DC3, and a DC4, and needs to lease a physical network of a transport network to transfer traffic between the DC1, the DC2, the DC3, and the DC4. The DC1, the DC2, the DC3, and the DC4 are respectively connected to nodes B, F, D, and C in the physical network. Therefore, the nodes B, F, D, and C are service access nodes. The physical network shown in FIG. 1 may be provided by the T-C, and by mapping the virtual network to a physical resource in the physical network, a virtual network that has a specific service and a topological structure expected by the client can be provided for the client. The physical resource includes a physical node resource and a physical link resource. The physical node resource may include a computing resource and a forwarding resource, and the computing resource and the forwarding resource may include a processing capability resource of a CPU on a physical node. The physical link resource may include a bandwidth resource, a delay, reliability, and the like. An implementation process of virtual network mapping may be divided into two steps, virtual node mapping and virtual link mapping. The virtual node mapping is a process of mapping a virtual node in the virtual network to a corresponding physical node in the physical network. The virtual link mapping is a process of mapping a virtual link in the virtual network to a corresponding physical path in the physical network. A virtual network mapping process is a process of mapping and configuring a physical network topology and a virtual network topology. One virtual node may be corresponding to multiple physical nodes (one subnet), and a virtual link may pass through multiple physical nodes (one subnet). Based on a shared physical network platform, in the virtual network mapping process, the following problem should be considered: how to find appropriate physical nodes and physical links for virtual nodes and virtual links in the virtual network topology to form a physical topology as a mapping result. Certainly, in the mapping process, various constraints need to be considered, such as a computing resource requirement of a virtual node, a bandwidth or delay requirement of a virtual link, and a topology requirement. A virtual network is constructed based on a client requirement, and the different client requirements may lead to different virtual network topologies, resource constraints, and the like. For example, in a virtual network, each virtual node requires a 1 gigahertz (GHz) CPU resource, and each virtual link requires a 10 megabits per second (Mbps) bandwidth resource. In addition, there may be other constraints, such as a geographical location constraint of a virtual node, and a delay constraint and a packet loss rate constraint of a virtual link during data transmission. In the mapping process, constraints of the virtual network on these resource requirements need to be satisfied. For example, a virtual network provided for the client includes virtual nodes vNE1, vNE2, vNE3, and vNE4, which are respectively mapped to physical nodes B, F, D, and C in the physical network. In addition, transmission traffic between the DC1 and the DC2 may be carried on vNE1-vNE2, transmission traffic between the DC1 and the DC3 may be carried on vNE1-vNE2-vNE3, and transmission traffic between the DC1 and the DC4 may be carried on vNE1-vNE4, transmission traffic between the DC2 and the DC3 may be carried on vNE2-vNE3, and transmission traffic between the DC2 and the DC4 may be carried on vNE2-vNE3-vNE4, and transmission traffic between the DC3 and the DC4 may be carried on vNE3-vNE4. A Client Controller (C-C) is used to control the virtual network leased by the client. Further, the C-C may be a standalone server or computer device. The C-C may perform operations such as connection establishment, connection modification, and connection deletion on the virtual network. For example, the client may establish, using the C-C, an end-to-end service connection in the virtual network according to a service requirement, and use the established service connection to carry a service. In addition, the client may perform operations such as modification and deletion on the established service connection.

In the following description process, the following concepts are used, which are explained herein.

Virtual link: In a virtual network topology, the virtual link is a connection between any two directly connected virtual nodes. The virtual link provides a bandwidth resource for one or more virtual connections.

Virtual connection: In the virtual network topology, the virtual connection is a path connection that is used to carry a data service and that is from a source virtual node to a sink virtual node, and may pass through at least one virtual link and occupy some or all bandwidth resources on the virtual link through which the virtual connection passes.

Physical link: In a physical network topology, the physical link is a connection between any two directly connected physical nodes. The physical link provides a bandwidth resource for one or more physical connections.

Physical connection: In the physical network topology, the physical connection is a path connection that is used to carry a data service and that is from a source physical node to a sink physical node, and may pass through at least one physical link, and occupy some or all bandwidth resources on the physical link through which the physical connection passes.

Figure 2:
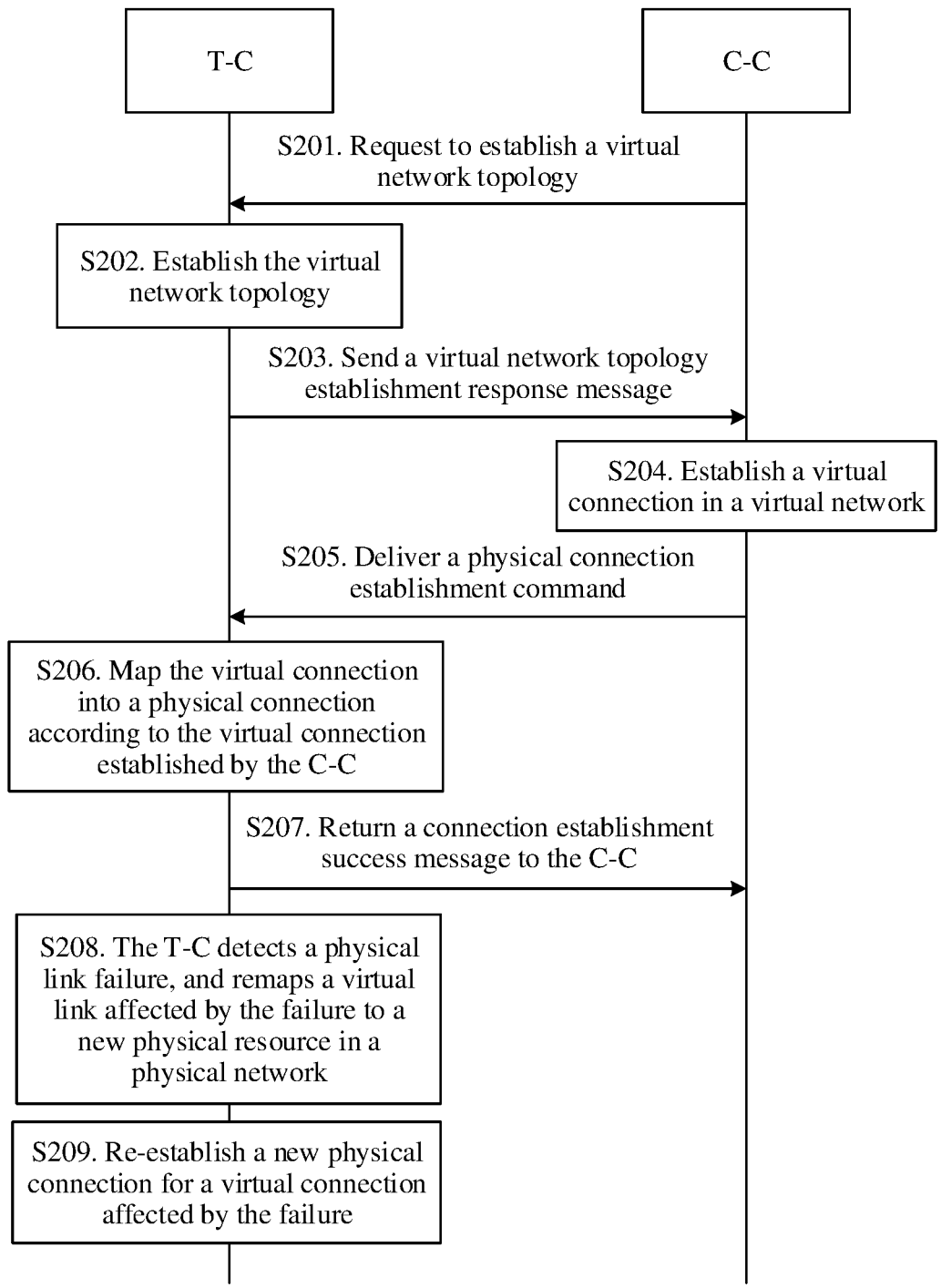
FIG. 2 is a signaling interaction diagram of a failure recovery method for a virtual network according to an embodiment of the present disclosure.

FIG. 2 is a signaling interaction diagram of a failure recovery method for a virtual network according to an embodiment of the present disclosure. In this embodiment, a T-C manages and controls a physical network, and a C-C manages and controls a virtual network. The T-C and the C-C implement establishment of a virtual network topology, virtual link failure recovery, and virtual connection failure recovery by means of signaling interaction. A specific implementation process is as follows.

Step S201: The C-C requests the T-C to establish a virtual network topology.

The C-C sends a virtual network topology establishment request message to the T-C, where the message carries a virtual network resource parameter and a virtual network failure recovery type. In a specific implementation process, the virtual network resource parameter may include transmission traffic between any two service access nodes, or may include virtual network topology information. The virtual network topology information may include virtual node information and virtual link information. The virtual node information may include a node identifier of each virtual node in the virtual network topology. The virtual link information may include a connection relationship between virtual nodes and a transmission bandwidth of a virtual link. The virtual network failure recovery type may include virtual topology dynamic recovery and virtual topology reserved recovery. In the virtual topology dynamic recovery, for physical nodes corresponding to virtual nodes at both ends of each virtual link, a cross-connection is separately configured for a transmit end and a receive end in a single direction, and a service is sent on a working path. When a physical link on the working path fails, a new physical resource is planned for the failed link in a free physical resource, and the service is switched to a physical link corresponding to the new physical resource. In the virtual topology reserved recovery, for physical nodes corresponding to virtual nodes at both ends of each virtual link, a cross-connection is separately configured for a transmit end and a receive end in a single direction, and a service is sent on a working path, and in addition, a failure recovery physical resource is reserved in a free physical resource for the working path, and when a physical link on the working path fails, the service is switched to a physical link corresponding to the failure recovery physical resource. Because a link and a service that are of a transport network are usually bidirectional, configuration is usually performed for both a transmission direction and a reception direction of a node at each end of the link. The free physical resource includes an available physical resource that is not leased or reserved by the virtual network and that is not occupied by another physical connection. The physical resource herein is mainly a bandwidth resource. Generally, the physical link has a specific bandwidth resource.

In an example of an implementation of the present disclosure, the T-C establishes the virtual network topology. The virtual network resource parameter includes information about a client's requirement for a virtual network resource, for example, the virtual network resource parameter may include traffic requirement matrix information between any two DCs. Traffic requirement matrix information between any two of the four DCs shown in FIG. 1 is shown in Table 1.

TABLE 1

| Connection relationship between DCs | Traffic |
|---|---|
| DC1-DC2 | 1.25 Gbps |
| DC1-DC3 | 2.5 Gbps |
| DC1-DC4 | 5 Gbps |
| DC2-DC3 | 5 Gbps |
| DC2-DC4 | 2.5 Gbps |
| DC3-DC4 | 5 Gbps |

In another example, the C-C plans the virtual network topology. The C-C may plan, according to the traffic requirement matrix information between any two DCs, the virtual network topology that satisfies the traffic requirement matrix information between the DCs. The virtual network resource parameter includes information about the virtual network topology planned by the C-C, such as virtual node information and virtual link information. The virtual network topology information of the pre-established virtual network shown in FIG. 1 is shown in Table 2.

TABLE 2

| Virtual link | Transmission bandwidth |
|---|---|
| vNE1-vNE2 | 3.75 Gbps |
| vNE2-vNE3 | 10 Gbps |
| vNE3-vNE4 | 7.5 Gbps |
| vNE1-vNE4 | 5 Gbps |

The planned virtual network topology satisfies the traffic requirement matrix information of the client, for example required traffic of 1.25 Gbps between the DC1 and the DC2 may be carried on the vNE1-vNE2, required traffic of 2.5 Gbps between the DC1 and the DC3 may be carried on vNE1-vNE2-vNE3, required traffic of 5 Gbps between the DC1 and the DC4 may be carried on the vNE1-vNE4, required traffic of 5 Gbps between the DC2 and the DC3 may be carried on the vNE2-vNE3, required traffic of 2.5 Gbps between the DC2 and the DC4 may be carried on vNE2-vNE3-vNE4, and required traffic of 5 Gbps between the DC3 and the DC4 may be carried on the vNE3-vNE4.

Step S202: The T-C establishes the virtual network topology for the C-C.

The T-C plans, in a free physical resource in the physical network, a physical resource according to the virtual network resource parameter and the virtual network failure recovery type that are in the virtual network topology establishment request message sent by the C-C, and maps the physical resource to the virtual network. The virtual network resource parameter may include at least one of the traffic requirement matrix information between any two DCs or the virtual network topology information. The free physical resource in the physical network includes an available physical resource that is not leased or reserved by the virtual network and that is not occupied by another physical connection. In a specific implementation process, an example in which the virtual network failure recovery type is the virtual topology dynamic recovery is used for description.

In an example of an implementation of the present disclosure, the T-C establishes the virtual network topology. The T-C may plan the virtual network topology according to the traffic requirement matrix information that is between any two DCs and that is sent by the C-C. In addition, the T-C may plan a virtual network topology vNE1-vNE2-vNE3-vNE4 according to the traffic requirement matrix information between any two DCs and the virtual network failure recovery type (for example, the virtual topology dynamic recovery) that are sent by the C-C, and plan, in the free physical resource in the physical network, the physical resource. For example, according to the traffic requirement matrix information that is between the DCs and that is shown in Table 1, the T-C may reserve a 5 Gbps physical resource on a physical link B-C, reserve a 7.5 Gbps physical resource on a physical link D-C, reserve a 10 Gbps physical resource on a physical link F-D, and reserve a 3.75 Gbps physical resource on both of physical links B-G and G-F. A node B is a service access node of the DC1, a node F is a service access node of the DC2, a node D is a service access node of the DC3, and a node C is a service access node of the DC4.

The T-C maps the virtual network topology vNE1-vNE2-vNE3-vNE4 to the reserved physical resource. The virtual node vNE1 corresponds to some or all resources of the physical node B, the virtual node vNE2 corresponds to some or all resources of the physical node F, the virtual node vNE3 corresponds to some or all physical resources of the physical node D, and the virtual node vNE4 corresponds to some or all physical resources of the physical node C. The virtual link vNE1-vNE2 corresponds to the physical resources reserved on the physical links B-G and G-F in the physical network, the virtual link vNE2-vNE3 corresponds to the physical resource reserved on the physical link F-D in the physical network, the virtual link vNE3-vNE4 corresponds to the physical resource reserved on the physical link D-C in the physical network, and the virtual link vNE1-vNE4 corresponds to the physical resource reserved on the physical link B-C in the physical network.

The planned virtual network topology satisfies the traffic requirement matrix information of the client. For example required traffic of 1.25 Gbps between the DC1 and the DC2 may be carried on the vNE1-vNE2, required traffic of 2.5 Gbps between the DC1 and the DC3 may be carried on vNE1-vNE2-vNE3, required traffic of 5 Gbps between the DC1 and the DC4 may be carried on the vNE1-vNE4, required traffic of 5 Gbps between the DC2 and the DC3 may be carried on the vNE2-vNE3, required traffic of 2.5 Gbps between the DC2 and the DC4 may be carried on vNE2-vNE3-vNE4, and required traffic of 5 Gbps between the DC3 and the DC4 may be carried on the vNE3-vNE4.

In another example, the C-C plans the virtual network topology. The T-C may plan, in the free physical resource in the physical network, the physical resource according to the virtual network topology information of a pre-planned virtual network and the virtual network failure recovery type (for example, the virtual topology dynamic recovery) that are sent by the C-C. The virtual network topology information includes the virtual node information and the virtual link information. For example, according to the virtual network topology information shown in Table 2, the T-C may reserve a 5 Gbps physical resource on a physical link B-C, reserve a 7.5 Gbps physical resource on a physical link D-C, reserve a 10 Gbps physical resource on a physical link F-D, and reserve a 3.75 Gbps physical resource on both of physical links B-G and G-F. A node B is a service access node of the DC1, a node F is a service access node of the DC2, a node D is a service access node of the DC3, and a node C is a service access node of the DC4.

The T-C maps a reserved physical resource to a virtual network topology vNE1-vNE2-vNE3-vNE4 pre-planned by the C-C. The virtual node vNE1 corresponds to some or all resources of the physical node B, the virtual node vNE2 corresponds to some or all resources of the physical node F, the virtual node vNE3 corresponds to some or all physical resources of the physical node D, and the virtual node vNE4 corresponds to some or all physical resources of the physical node C. The virtual link vNE1-vNE2 corresponds to the physical resources reserved on the physical links B-G and G-F in the physical network, the virtual link vNE2-vNE3 corresponds to the physical resource reserved on the physical link F-D in the physical network, the virtual link vNE3-vNE4 corresponds to the physical resource reserved on the physical link D-C in the physical network, and the virtual link vNE1-vNE4 corresponds to the physical resource reserved on the physical link B-C in the physical network.

Step S203: The T-C sends a virtual network topology establishment response message to the C-C.

After the T-C establishes the virtual network topology, the T-C stores and maintains information such as the virtual network topology information of the established virtual network, and a mapping relationship between the virtual network topology and the physical resource in the physical network. The mapping relationship between the virtual network topology and the physical resource in the physical network includes a mapping relationship between a virtual node and a physical node, a mapping relationship between a virtual link and a physical link, and a mapping relationship between a bandwidth resource on the virtual link and a bandwidth resource on the physical link. In addition, the T-C sends the virtual network topology establishment response message to the C-C.

In an example of an implementation of the present disclosure, the T-C establishes the virtual network topology. The virtual network topology establishment response message sent by the T-C to the C-C may carry information indicating a virtual network topology establishment success, and may further carry virtual network topology information, such as virtual node information and/or virtual link information.

In another example, the C-C plans the virtual network topology. The virtual network topology establishment response message sent by the T-C to the C-C carries information indicating a virtual network topology establishment success, but does not carry virtual network topology information.

Step S204: The C-C establishes a virtual connection in a virtual network.

After obtaining the virtual network topology information, the C-C may control the virtual network. For example, a connection is established in the virtual network to transfer a service between DCs. In a specific implementation process, the C-C calculates, in the virtual network according to virtual network resource information and actual traffic requirement information between the DCs during service transfer, a virtual connection that satisfies traffic requirement matrix information between a source DC and a sink DC.

For example, it is assumed that a connection with a bandwidth of 1.25 Gbps needs to be established between the DC1 and the DC3, and a path calculated by the C-C in the virtual network topology is vNE1-vNE2-vNE3. The C-C respectively reserves a 1.25 Gbps resource on virtual links vNE1-vNE2 and vNE2-vNE3, and establishes a virtual connection vNE1-vNE2-vNE3. Because a virtual node does not have an entity, and only node information is stored in the C-C and the T-C, the "establishing a virtual connection" mentioned herein means in essence that the C-C changes virtual node information and virtual link information in a database in which the C-C stores the virtual network. For example, for the virtual node vNE2, the C-C stores a piece of information about a "cross-connection between a 1.25 Gbps resource on the left of the vNE2 and a 1.25 Gbps resource on the right of the vNE2".

Step S205: The C-C delivers a physical connection establishment command to the T-C.

After establishing the virtual connection vNE1-vNE2-vNE3 in the virtual network, the C-C sends the physical connection establishment command to the T-C, and establishes cross-connections between physical nodes in the physical network according to cross-connections between virtual nodes in order to establish a corresponding physical connection for the virtual connection vNE1-vNE2-vNE3.

Step S206: The T-C maps the virtual connection into a physical connection according to the virtual connection established by the C-C.

After receiving the physical connection establishment command sent by the C-C, the T-C maps, in the physical resource in the physical network, the virtual connection vNE1-vNE2-vNE3 in the virtual network into the physical connection according to the stored virtual network topology information and the stored mapping relationship between the virtual network topology and the physical resource in the physical network, and establishes a cross-connection on each physical node.

The virtual network failure recovery type is the virtual topology dynamic recovery.

The T-C allocates, to a virtual link vNE1-vNE2, a 1.25 Gbps bandwidth resource in 3.75 Gbps bandwidth resources reserved on physical links B-G and G-F through which a physical resource corresponding to the virtual link passes, and performs the following operations configuring, on the first service node, that is, a node B, a cross-connection between an access side port of the DC1 and a 1.25 Gbps bandwidth resource allocated on the B-G, and configuring, on a node G, a cross-connection between a 1.25 Gbps bandwidth resource allocated on the B-G and a 1.25 Gbps bandwidth resource allocated on the G-F.

The T-C allocates, to a virtual link vNE2-vNE3, a 1.25 Gbps bandwidth resource in a 10 Gbps bandwidth resource reserved on a physical link F-D through which a physical resource corresponding to the virtual link passes, and performs the operations of configuring, on a node F, a cross-connection between a 1.25 Gbps bandwidth resource allocated on the G-F and a 1.25 Gbps bandwidth resource allocated on the F-D, and configuring, on the last service node, that is, a node D, a cross-connection between a 1.25 Gbps bandwidth resource allocated on the F-D and an access side port of the DC3.

It should be noted that because a link and a service that are of a transport network are usually bidirectional, a node at one end of the link is both a transmit end node in one direction and a receive end node in the other direction. Because two directions are symmetrical, only one of the two directions is described in the foregoing description.

Step S207: The T-C returns, to the C-C, a connection establishment success message.

After establishing the physical connection for the C-C, the T-C updates the virtual network topology information. For example, a physical resource, that is, a 1.25 Gbps bandwidth resource, corresponding to the virtual connection vNE1-vNE2-vNE3 is occupied, and the T-C returns the connection establishment success message to the C-C.

Step S208: The T-C detects a physical link failure, and remaps a virtual link affected by the failure to a new physical resource in a physical network.

When a physical link in the physical network fails, a node at one end of the failed physical link reports failure alarm information to the T-C after detecting the failure. A manner in which the node at the end of the failed physical link detects the failure includes that for a unidirectional link, a node at a downstream end of the failed physical link detects the failure, and for a bidirectional link, nodes at both ends of the failed physical link detect the failure. The T-C determines whether the failed physical link affects a virtual link in the virtual network, that is, whether some or all physical resources in the failed physical link are mapped to the virtual link in the virtual network, and the failed physical link affects the virtual link in the virtual network if some or all the physical resources in the failed physical link are mapped to the virtual link in the virtual network. In addition, the T-C may determine, according to the virtual network failure recovery type, whether the virtual link affected by the failure needs to be recovered. If the virtual link needs to be recovered, the T-C re-plans, in the free physical resource in the physical network, that is, an unleased or unreserved physical resource, a new physical resource between physical nodes corresponding to virtual nodes at both ends of the virtual link affected by the failure, and maps the virtual link affected by the failure to the new physical resource in the physical network. The new physical resource satisfies a transmission bandwidth of the virtual link affected by the failure.

Figure 3:
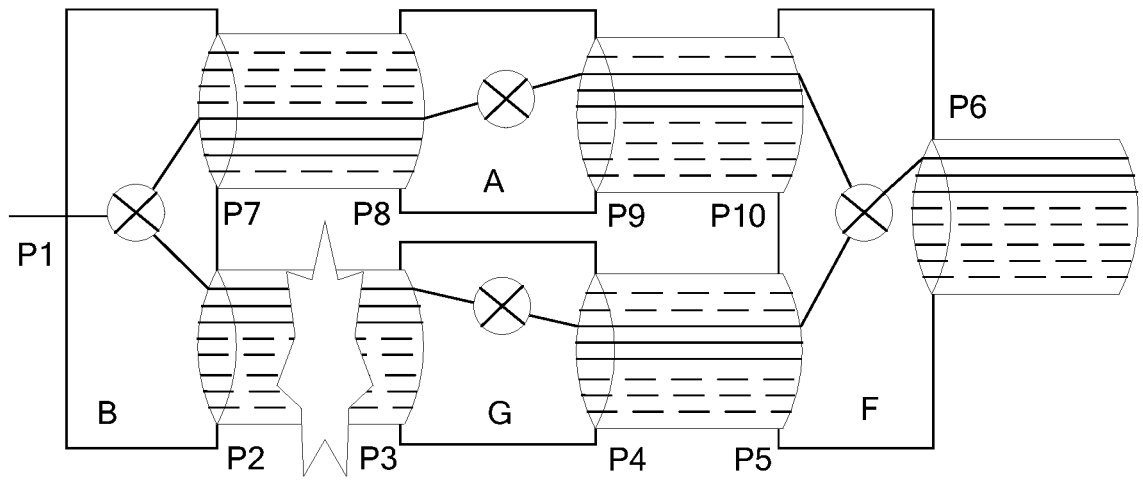
FIG. 3 is a structural diagram of physical network resource allocation according to an embodiment of the present disclosure.

For example, as shown in FIG. 3 (only nodes A, B, F and G are shown in FIG. 3), it is assumed that a physical link B-G fails. The T-C determines that a 3.75 Gbps bandwidth resource on the B-G corresponds to a virtual link vNE1-vNE2 in the virtual network. Therefore, the failed physical link B-G affects the virtual link vNE1-vNE2 in the virtual network. In addition, the T-C learns that a bandwidth resource on the virtual link vNE1-vNE2 is 3.75 Gbps, the virtual node vNE1 corresponds to the physical node B, and the virtual node vNE2 corresponds to the physical node F. Therefore, the T-C reserves, in a free physical resource between physical nodes B and F, a new physical resource, and maps the virtual link vNE1-vNE2 to the new physical resource. For example, the T-C reserves a 3.75 Gbps bandwidth resource on a physical link B-A, and reserves a 3.75 Gbps bandwidth resource on a physical link A-F, and then maps the virtual link vNE1-vNE2 to the 3.75 Gbps bandwidth resources on the physical links B-A and A-F.

The T-C updates and stores a mapping relationship between the virtual network topology and the new physical resource in the physical network, for example, a mapping relationship between the virtual link vNE1-vNE2 and the 3.75 Gbps bandwidth resources on the physical links B-A and A-F. After being mapped to the new physical resource, the virtual network topology may keep unchanged, and is the same as that before being mapped to the new physical resource.

Step S209: The T-C re-establishes a new physical connection for a virtual connection affected by the failure.

The T-C queries the virtual connection affected by the failure, that is, in a virtual link through which the virtual connection passes, at least one virtual link is affected by the failed physical link, and re-establishes the new physical connection on the new physical resource corresponding to the virtual connection affected by the failure. The new physical connection satisfies a transmission bandwidth of the virtual connection affected by the failure. In addition, after re-establishing the new physical connection, the T-C may keep the virtual network topology unchanged.

For example, a physical resource, that is, a 1.25 Gbps bandwidth resource, corresponding to the virtual connection vNE1-vNE2-vNE3 established in step S204 passes through virtual links vNE1-vNE2 and vNE2-vNE3. A physical resource corresponding to the virtual link vNE1-vNE2 changes, that is, 1.25 Gbps bandwidth resources on the physical links B-G and G-F change to 1.25 Gbps bandwidth resources on the physical links B-A and A-F. Therefore, the T-C needs to re-establish a new cross-connection between physical nodes on the physical resource corresponding to the virtual link vNE1-vNE2.

When the transport network is an OTN, it is assumed that each link in the physical network is an ODU2 link with a bandwidth of 10 Gbps, bandwidth resources on the link are discrete, each 1.25 Gbps bandwidth resource is a timeslot, and there are eight timeslots in total on the ODU2 link. As shown in FIG. 3, there are eight lines in total on each of physical links B-A, A-F, B-G, and G-F, including five dashed lines and three solid lines and representing the eight timeslots on the ODU2 link. The dashed lines represent timeslots that are on the physical links and that are not occupied by the virtual network, and the solid lines represent timeslots that are on the physical links and that are occupied by the virtual network. Further, for a physical node B corresponding to a virtual node vNE1 at one end of the virtual link vNE1-vNE2: it is assumed that timeslots #1 to #3 on the physical link B-G are used by a virtual link before a failure occurs, the virtual connection established in step S204 occupies a timeslot #1 on the B-G, and timeslots #5 to #7 on the physical link B-A are reallocated for the virtual link after the failure occurs. A cross-connection is configured on the node B, and a "cross-connection that is between P1 and a timeslot #1 of P2" is changed to a "cross-connection that is between P1 and a timeslot #5 of P7". Any idle timeslot may be selected from the timeslots #5 to #7 on the B-A. For a physical node F corresponding to a virtual node vNE2 at the other end of the virtual link vNE1-vNE2: it is assumed that timeslots #3 to #5 on the physical link G-F are used by a virtual link before a failure occurs, the virtual connection established in step S204 occupies a timeslot #3 on the physical link G-F, and timeslots #2 to #4 on the physical link A-F are reallocated for the virtual link after the failure occurs. A cross-connection is configured on the node F, and a "cross-connection that is between a timeslot #3 of P5 and a timeslot #1 of P6" is changed to a "cross-connection between a timeslot #2 of P10 and the timeslot #1 of P6". Any idle timeslot may be selected from the timeslots #2 to #4 on the A-F. For an intermediate node G on a physical resource corresponding to the virtual link vNE1-vNE2 before the failure occurs: a cross-connection established on the node G for the virtual link vNE1-vNE2 affected by the failure may be deleted. For example, a cross-connection between a timeslot #1 of P3 and a timeslot #3 of P4 that is on the node G is deleted. For an intermediate node A on a physical resource corresponding to the virtual link vNE1-vNE2 after failure recovery: for the virtual link vNE1-vNE2 affected by the failure, a timeslot resource is allocated and a cross-connection is established. For example, after the node A determines that the timeslot #5 is allocated on the physical link B-A and that the timeslot #2 is allocated on the physical link A-F, a cross-connection between a timeslot #5 of P8 and a timeslot #2 of P9 is established on the node A.

According to the technical solution provided in this embodiment of the present disclosure, the T-C maps, according to information that is about a failed physical link and that is carried in a received failure recovery request message, a virtual link corresponding to the failed physical link to a non-failed physical resource in a physical network such that failure recovery can be performed on a virtual network. When a physical resource corresponding to the virtual network fails, the failure recovery can be quickly performed on the virtual network, and a service carried on a virtual link after the failure recovery is the same as that before the failure occurs such that a client does not need to adjust the virtual network when the failure occurs, thereby improving user experience.

Figure 4:
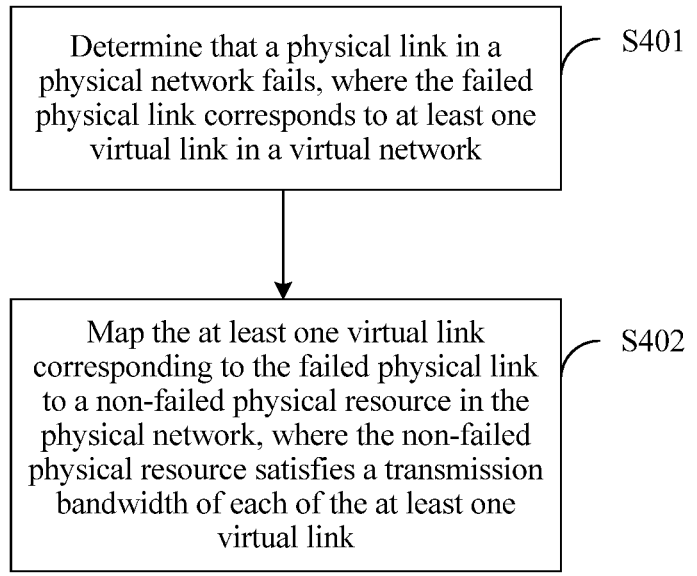
FIG. 4 is an example of a flowchart of a failure recovery method for a virtual network according to an embodiment of the present disclosure.

FIG. 4 is an example of a flowchart of a failure recovery method for a virtual network according to an embodiment of the present disclosure. In a specific implementation process, the method may be performed by a T-C on an operator side, and the T-C may be a server or a computer device. The method includes the following steps.

Step S401: Determine that a physical link in a physical network fails, where the failed physical link corresponds to at least one virtual link in the virtual network.

In a specific implementation process, before the physical link fails, a virtual network topology is first established. Further, the T-C receives a virtual network topology establishment request message sent by a C-C. The virtual network topology establishment request message carries at least one of a virtual network resource parameter or a virtual network failure recovery type, and the T-C reserves, in a free physical resource in the physical network according to the virtual network resource parameter and/or the virtual network failure recovery type, a physical resource that satisfies the virtual network resource parameter, and maps the reserved physical resource to the virtual network in order to form the virtual network topology. The virtual network failure recovery type includes virtual topology dynamic recovery and virtual topology reserved recovery.

There are two implementations for establishment of the virtual network. One implementation is that the virtual network resource parameter includes transmission traffic between any two service access nodes, and the T-C reserves, in the free physical resource in the physical network according to the transmission traffic between any two service access nodes, the physical resource that satisfies the virtual network resource parameter. The other implementation is that the C-C may pre-plan the virtual network topology according to transmission traffic between any two service access nodes, that is, traffic requirement matrix information. Therefore, the virtual network resource parameter may include virtual network topology information, such as virtual node information and virtual link information. The virtual link information may include a transmission bandwidth of a virtual link. The T-C reserves, in the free physical resource in the physical network, the physical resource for the virtual network according to the virtual network topology information of the pre-planned virtual network, such as the virtual node information, the virtual link information, and the transmission bandwidth of the virtual link.

After establishing the virtual network, the T-C stores and maintains the virtual network topology information of the established virtual network, and a mapping relationship between the virtual network topology and the physical resource in the physical network. In addition, the T-C sends a virtual network topology establishment response message to the C-C.

Step S402: Map the at least one virtual link corresponding to the failed physical link to a non-failed physical resource in the physical network, where the non-failed physical resource satisfies a transmission bandwidth of each of the at least one virtual link.

In a specific implementation process, the T-C maps the at least one virtual link corresponding to the failed physical link to a new physical resource in the physical network. The new physical resource is a non-failed free physical resource, that is, an unleased or unreserved physical resource. In addition, the new physical resource satisfies the transmission bandwidth of the virtual link in the virtual network. Further, the T-C stores a mapping relationship between the virtual network topology and the new physical resource.

A physical connection may be established on the failed physical link. In this case, the T-C queries whether the physical connection established on the failed physical link corresponds to a virtual connection in the virtual network. If there is a virtual connection corresponding to the physical connection, the T-C maps, in the non-failed physical resource, the corresponding virtual connection into a new physical connection, and establishes a cross-connection between physical nodes on the new physical connection.

In this embodiment of the present disclosure, the T-C determines that a physical link in a physical network fails, and the failed physical link affects a virtual link in a virtual network, and the T-C maps, in a free physical resource in the physical network, the virtual link affected by a failure to a non-failed physical resource. According to the foregoing technical solution, failure recovery can be performed on the virtual network. When a physical resource corresponding to the virtual network fails, the failure recovery can be quickly performed on the virtual network, and a topology of the virtual network after the failure recovery is the same as that before the failure occurs, thereby improving user experience.

Figure 5:
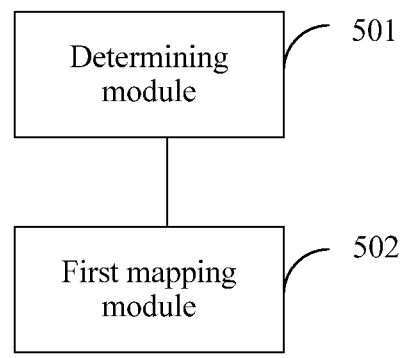
FIG. 5 is a schematic diagram of a logical structure of a transport controller according to an embodiment of the present disclosure.

FIG. 5 is a schematic diagram of a logical structure of a transport controller according to an embodiment of the present disclosure. As shown in FIG. 5, the transport controller may be a standalone server, or may be disposed on one of physical nodes in a physical network as a function unit. Further, the transport controller may include a determining module 501 and a first mapping module 502.

The determining module 501 is configured to determine that a physical link in the physical network fails, where the failed physical link corresponds to at least one virtual link in the virtual network.

The transport controller further includes a first judgment module (not shown) configured to determine, according to a failure recovery type of the virtual network, the at least one virtual link that is in the virtual network and that corresponds to the failed physical link needs to be recovered.

The first mapping module 502 is configured to map the at least one virtual link corresponding to the failed physical link to a non-failed physical resource in the physical network, where the non-failed physical resource satisfies a transmission bandwidth of each of the at least one virtual link.

The first mapping module 502 is configured to map the at least one virtual link corresponding to the failed physical link to a new physical resource in the physical network. The new physical resource is a non-failed free physical resource, that is, an unleased or unreserved physical resource. In addition, the new physical resource satisfies the transmission bandwidth of the virtual link in the virtual network. The transport controller further includes a storage module (not shown) configured to store a mapping relationship between a virtual network topology and the new physical resource.

Further, the transport controller further includes a second judgment module (not shown) configured to determine a virtual connection exists on the at least one virtual link corresponding to the failed physical link. The transport controller further includes a second mapping module (not shown) configured to map, in the non-failed physical resource, the corresponding virtual connection into a new physical connection, and establish a cross-connection between physical nodes on the new physical connection if there is a virtual connection corresponding to a physical connection.

In this embodiment of the present disclosure, the transport controller determines that a physical link in a physical network fails, and the failed physical link affects a virtual link in a virtual network, and maps, in a free physical resource in the physical network, the virtual link affected by a failure to a non-failed physical resource. According to the foregoing technical solution, failure recovery can be performed on the virtual network. When a physical resource corresponding to the virtual network fails, the failure recovery can be quickly performed on the virtual network, and a topology of the virtual network after the failure recovery is the same as that before the failure occurs, thereby improving user experience.

Figure 6:
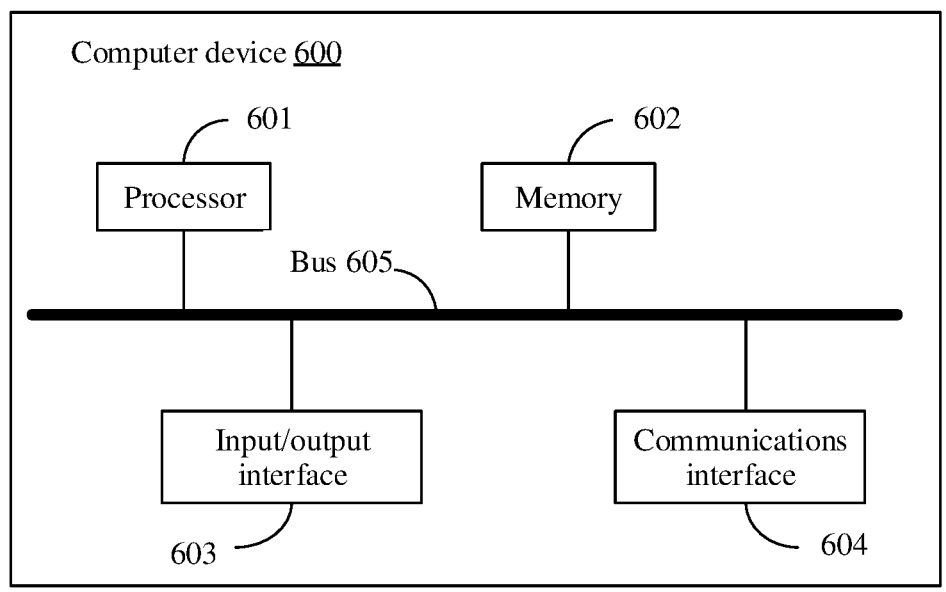
FIG. 6 is a schematic structural diagram of a computer device according to an embodiment of the present disclosure.

FIG. 6 is a schematic structural diagram of a computer device 600 according to an embodiment of the present disclosure. As shown in FIG. 6, the computer device 600 includes a processor 601, a memory 602, an input/output interface 603, a communications interface 604, and a bus 605. The processor 601, the memory 602, the input/output interface 603, and the communications interface 604 implement mutual communication connections using the bus 605.

The processor 601 may be a general CPU, a microprocessor, an application-specific integrated circuit (ASIC), or at least one integrated circuit, and is configured to execute a related program in order to implement a technical solution provided in this embodiment of the present disclosure.

The memory 602 may be a read-only memory (ROM), a static storage device, a dynamic storage device, or a random access memory (RAM). The memory 602 may store an operating system and another application program. When the technical solution provided in this embodiment of the present disclosure is implemented using software or firmware, program code used to implement the technical solution provided in this embodiment of the present disclosure is stored in the memory 602, and is executed by the processor 601.

The input/output interface 603 is configured to receive inputted data and information, and output data, such as an operation result.

The communications interface 604 uses a transceiver apparatus, for example but not limited to a transceive, to implement communication between the computer device 600 and another device or a communications network.

The bus 605 may include a channel for transferring information between parts (such as the processor 601, the memory 602, the input/output interface 603, and the communications interface 604) of the computer device 600.

In a specific implementation process, a transport controller executes code stored in the memory 602 using the processor 601 in order to implement determining that a physical link in a physical network fails, where the failed physical link corresponds to at least one virtual link in the virtual network, and mapping the at least one virtual link corresponding to the failed physical link to a non-failed physical resource in the physical network, where the non-failed physical resource satisfies a transmission bandwidth of each of the at least one virtual link.

In this embodiment of the present disclosure, the transport controller determines that a physical link in a physical network fails, and the failed physical link affects a virtual link in a virtual network, and maps, in a free physical resource in the physical network, the virtual link affected by a failure to a non-failed physical resource. According to the foregoing technical solution, failure recovery can be performed on the virtual network. When a physical resource corresponding to the virtual network fails, the failure recovery can be quickly performed on the virtual network, and a topology of the virtual network after the failure recovery is the same as that before the failure occurs, thereby improving user experience.

It should be noted that, although only the processor 601, the memory 602, the input/output interface 603, the communications interface 604, and the bus 605 of the computer device 600 are shown in FIG. 6, in a specific implementation process, a person skilled in the art should understand that the computer device 600 further includes another device required for normal running. In addition, a person skilled in the art should understand that, according to a specific requirement, the computer device 600 may further include a hardware device that implements another additional function. In addition, a person skilled in the art should understand that the computer device 600 may also include only devices required for implementing the embodiments of the present disclosure, but not necessarily includes all devices shown in FIG. 6.

A person of ordinary skill in the art may understand that, each aspect of the present disclosure or a possible implementation of each aspect may be implemented as a system, a method, or a computer program product. Therefore, each aspect of the present disclosure or a possible implementation of each aspect may use forms of hardware only embodiments, software only embodiments (including firmware, resident software, and the like), or embodiments with a combination of software and hardware, which are uniformly referred to as "circuit," "module," or "system" herein. In addition, each aspect of the present disclosure or the possible implementation of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a RAM, a ROM, an erasable programmable ROM (EPROM or flash memory), an optical fiber, and a compact disc ROM (CD-ROM).

A processor in a computer reads computer-readable program code stored in a computer-readable medium such that the processor can perform a function and an action specified in each step or a combination of steps in a flowchart, an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may actually be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A failure recovery method for a virtual network, comprising:
    determining that a physical link in a physical network has failed, wherein the failed physical link corresponds to at least one virtual link in the virtual network;
    mapping the at least one virtual link corresponding to the failed physical link to a non-failed physical resource in the physical network, wherein the non-failed physical resource satisfies a transmission bandwidth of each of the at least one virtual link;
    receiving a virtual network topology establishment request message from a client controller before the physical link fails, wherein the virtual network topology establishment request message carries a virtual network resource parameter and a virtual network failure recovery type;
    reserving, in a free physical resource in the physical network, a physical resource according to the virtual network resource parameter and the virtual network failure recovery type, wherein the physical resource satisfies the virtual network resource parameter; and
    mapping the physical resource to the virtual network.

2. The failure recovery method of claim 1, wherein before mapping the at least one virtual link corresponding to the failed physical link to the non-failed physical resource in the physical network, the method further comprises determining, according to a failure recovery type of the virtual network, the at least one virtual link in the virtual network corresponding to the failed physical link that needs to be recovered.

3. The failure recovery method of claim 1, further comprising determining, after mapping the at least one virtual link corresponding to the failed physical link to the non-failed physical resource in the physical network, that a virtual connection exists on the at least one virtual link corresponding to the failed physical link, wherein the virtual connection is a path connection that is used to carry a data service and that is from a source virtual node to a sink virtual node.

4. The failure recovery method of claim 3, further comprising mapping the virtual connection into a new physical connection.

5. The failure recovery method of claim 4, wherein the new physical connection is established by the non-failed physical resource.

6. The failure recovery method of claim 5, wherein the new physical connection satisfies a transmission bandwidth of the virtual connection.

7. The failure recovery method of claim 1, wherein after mapping the at least one virtual link corresponding to the failed physical link to the non-failed physical resource in the physical network, the method further comprises storing a mapping relationship between a virtual network topology and the non-failed physical resource.

8. The failure recovery method of claim 1, wherein the virtual network resource parameter comprises transmission traffic between any two service access nodes.

9. The failure recovery method of claim 1, wherein the virtual network resource parameter comprises virtual network topology information.

10. The failure recovery method of claim 9, wherein the virtual network topology information comprises virtual node information and virtual link information.

11. The failure recovery method of claim 1, wherein the virtual network failure recovery type comprises virtual topology dynamic recovery and virtual topology reserved recovery.

12. A failure recovery apparatus for a virtual network, comprising:
    a memory configured to store a program;
    a receiver configured to receive a virtual network topology establishment request message from a client controller, wherein the virtual network topology establishment request message carries a virtual network resource parameter and a virtual network failure recovery type; and
    a processor coupled to the memory and the receiver, wherein the program causes the processor to be configured to:
        determine that a physical link in a physical network has failed, wherein the failed physical link corresponds to at least one virtual link in the virtual network;
        map the at least one virtual link corresponding to the failed physical link to a non-failed physical resource in the physical network, wherein the non-failed physical resource satisfies a transmission bandwidth of each of the at least one virtual link;
        reserve, in a free physical resource in the physical network, a physical resource according to the virtual network resource parameter and the virtual network failure recovery type, wherein the physical resource satisfies the virtual network resource parameter; and
        map the physical resource to the virtual network.

13. The failure recovery apparatus of claim 12, wherein the program further causes the processor to be configured to determine, according to a failure recovery type of the virtual network, the at least one virtual link in the virtual network corresponding to the failed physical link that needs to be recovered.

14. The failure recovery apparatus of claim 12, wherein the program further causes the processor to be configured to determine that a virtual connection exists on the at least one virtual link corresponding to the failed physical link, wherein the virtual connection is a path connection that is used to carry a data service and that is from a source virtual node to a sink virtual node.

15. The failure recovery apparatus of claim 14, wherein the program further causes the processor to be configured to map the virtual connection into a new physical connection.

16. The failure recovery apparatus of claim 15, wherein the new physical connection is established by the non-failed physical resource, and wherein the new physical connection satisfies a transmission bandwidth of the virtual connection.

17. The failure recovery apparatus of claim 12, wherein the memory is further configured to store a mapping relationship between a virtual network topology and the non-failed physical resource.

18. The failure recovery apparatus of claim 12, wherein the virtual network resource parameter comprises transmission traffic between any two service access nodes.

19. The failure recovery apparatus of claim 12, wherein the virtual network resource parameter comprises virtual network topology information, and wherein the virtual network topology information comprises virtual node information and virtual link information.

20. The failure recovery apparatus of claim 12, wherein the virtual network failure recovery type comprises virtual topology dynamic recovery and virtual topology reserved recovery.

\* \* \* \* \*